(12) United States Patent
Peterson et al.

(10) Patent No.: US 10,005,381 B2
(45) Date of Patent: Jun. 26, 2018

(54) SIDE-LOADING LIFTGATE HAVING INTEGRATED STABILIZER LEG

(71) Applicant: Palfinger Liftgates, LLC, Cerritos, CA (US)

(72) Inventors: Hakan Peterson, Long Beach, CA (US); Michael C. Jones, Torrance, CA (US)

(73) Assignee: Palfinger Liftgates, LLC, Cerritos, CA (US)

( * ) Notice: Subject to any disclaimer, the term of this patent is extended or adjusted under 35 U.S.C. 154(b) by 49 days.

(21) Appl. No.: 15/132,308

(22) Filed: Apr. 19, 2016

(65) Prior Publication Data

US 2017/0297469 A1    Oct. 19, 2017

(51) Int. Cl.
*B60P 1/44* (2006.01)
*B65G 67/02* (2006.01)
*B65G 69/22* (2006.01)

(52) U.S. Cl.
CPC .............. *B60P 1/4457* (2013.01); *B60P 1/445* (2013.01); *B60P 1/4471* (2013.01); *B65G 67/02* (2013.01); *B65G 69/22* (2013.01)

(58) Field of Classification Search
CPC ......... B60P 1/4471; B60P 1/44; B60P 1/4414; B60P 1/445
See application file for complete search history.

(56) References Cited

U.S. PATENT DOCUMENTS

| | | | | |
|---|---|---|---|---|
| 2,963,185 | A * | 12/1960 | Jones | B60P 1/6418 298/11 |
| 3,459,312 | A * | 8/1969 | Britcher, Jr. | B22D 41/12 105/163.1 |
| 3,499,684 | A * | 3/1970 | McCracken | E21C 27/24 299/64 |
| 3,834,731 | A * | 9/1974 | Uehara | B62D 37/00 280/766.1 |
| 4,941,546 | A * | 7/1990 | Nist | E06C 5/38 182/17 |
| 7,274,980 | B1 * | 9/2007 | Schafer | B60P 1/4471 701/36 |
| 8,534,982 | B2 * | 9/2013 | Meenen | A01D 75/002 414/550 |
| 9,708,119 | B2 * | 7/2017 | DiSorbo | B60P 1/36 |
| 2011/0305550 | A1 * | 12/2011 | Haire | B60P 1/02 414/495 |
| 2016/0257023 | A1 * | 9/2016 | Bowman | B27L 7/00 |

FOREIGN PATENT DOCUMENTS

SU        1258812 A   *   9/1986

OTHER PUBLICATIONS

Palfinger Liftgates, LLC—ILSL 33/44 Owner's Manual, Jun. 10, 2015, U.S.A.
Palfinger Liftgates, LLC—ILSL Parts Manual, Feb. 13, 2014, U.S.A.

* cited by examiner

*Primary Examiner* — James Keenan
(74) *Attorney, Agent, or Firm* — Hodgson Russ LLP (57) ABSTRACT

A sideloader liftgate system automatically extends a stabilizer leg when a liftgate is deployed, and automatically retracts the stabilizer leg when the liftgate is stored. Adjustment of the liftgate and stabilizer leg is carried out in response to a single user command. The invention prevents a user from forgetting to extend the stabilizer leg for safely using the liftgate, and also prevents a user from forgetting to retract the stabilizer leg before towing the trailer.

5 Claims, 7 Drawing Sheets

FIG. 6
DEPLOY AND EXTEND

FIG. 7
STORE AND RETRACT

SIDE-LOADING LIFTGATE HAVING INTEGRATED STABILIZER LEG

FIELD OF THE INVENTION

The present invention relates generally to liftgate mechanisms mounted on truck trailers for loading and unloading cargo. More specifically, the present invention relates to a safer side-loading liftgate.

BACKGROUND OF THE INVENTION

In the trucking industry, it is known to equip a truck trailer with one or more liftgates for cargo handling. In one type of arrangement, the liftgate may be mounted to a subframe on the underside of the trailer at a rear or side door location of the trailer. The liftgate includes a platform for supporting cargo and an actuated linkage for moving the platform through various positions relative to the trailer, including (i) a storage position under the trailer, (ii) a raised position outside the trailer adjacent the trailer door, wherein the platform is approximately coplanar with a floor of the trailer, and (iii) a lowered position outside the trailer at ground level below the raised position. The actuated linkage may be a hydraulically-powered linkage capable of lifting heavy loads, for example loads on the order of 4,000 pounds.

In the case of a liftgate mounted at a side door of a trailer, commonly referred to as a "sideloader," imbalance during loading and unloading of heavy cargo loads poses a safety issue. The trailer will tilt toward the side of the load, which may cause cargo in the trailer and cargo on the liftgate platform to slide in a manner that may endanger nearby personnel. Because of this, it is known to provide an extendable stabilizer leg on the underside of the truck trailer adjacent the side-loading liftgate. The stabilizer leg, which is normally retracted when not in use, may be selectively extended downward to engage the ground near the side-loading liftgate to prevent the trailer from tilting when the liftgate is in use.

Despite the availability of stabilizer legs, safety challenges remain. For example, an operator may forget to deploy the stabilizer leg prior to moving cargo onto the liftgate platform from the ground during loading, or moving cargo out of the trailer onto the liftgate during unloading. Failure to extend the stabilizer leg is more likely to happen when the operator is in a hurry to load and/or unload the trailer.

Another problem associate with stabilizer legs is that the operator may forget to retract the stabilizer leg after using the liftgate. While the liftgate itself may be properly stored, the operator may not notice that the stabilizer leg remains deployed, and the operator may start driving while the stabilizer leg is still extended. This can cause expensive damage to the trailer, and may pose safety risks to vehicles and persons behind the trailer.

What is needed is a stabilizer leg that is always extended when the liftgate is placed into service, and that is always retracted when the liftgate is returned to storage.

SUMMARY OF THE INVENTION

The present invention provides a sideloader liftgate system for a trailer that automatically extends a stabilizer leg of the liftgate system when a liftgate of the liftgate system is deployed, and automatically retracts the stabilizer leg when the liftgate is stored.

In addition to the liftgate and the stabilizer leg, the liftgate system generally comprises a deployment mechanism connecting the liftgate to the trailer, an actuation system, and a user control interface. The deployment mechanism is adjustable to move the liftgate relative to the trailer between a storage position and a usage position, and the stabilizer leg is adjustable between a retracted state and an a ground-engaging extended state. The actuation system is operable to adjust both the deployment mechanism and the stabilizer leg. The control interface allows a user to issue user-selectable commands to operate the actuation system. One selectable command is a deployment command causing the actuation system to adjust the deployment mechanism to move the liftgate from the storage position to the usage position and to adjust the stabilizer leg from the retracted state to the extended state. Another selectable command is a storage command causing the actuation system to adjust the deployment mechanism to move the liftgate from the usage position to the storage position and to adjust the stabilizer leg from the extended state to the retracted state.

The present invention encompasses a method of operating a liftgate system for a trailer. The method generally comprises the steps of inputting a deployment command to an actuation system, and operating the actuation system in response to the deployment command to (i) deploy a liftgate of the liftgate system relative to the trailer from a storage position to a usage position and (ii) actuate a stabilizer leg of the liftgate system from a retracted state to an extended state. The method may further comprise the steps of inputting a storage command to the actuation system, and operating the actuation system in response to the storage command to (i) move the liftgate relative to the trailer from the usage position to the storage position and (ii) actuate the stabilizer leg from the extended state to the retracted state.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
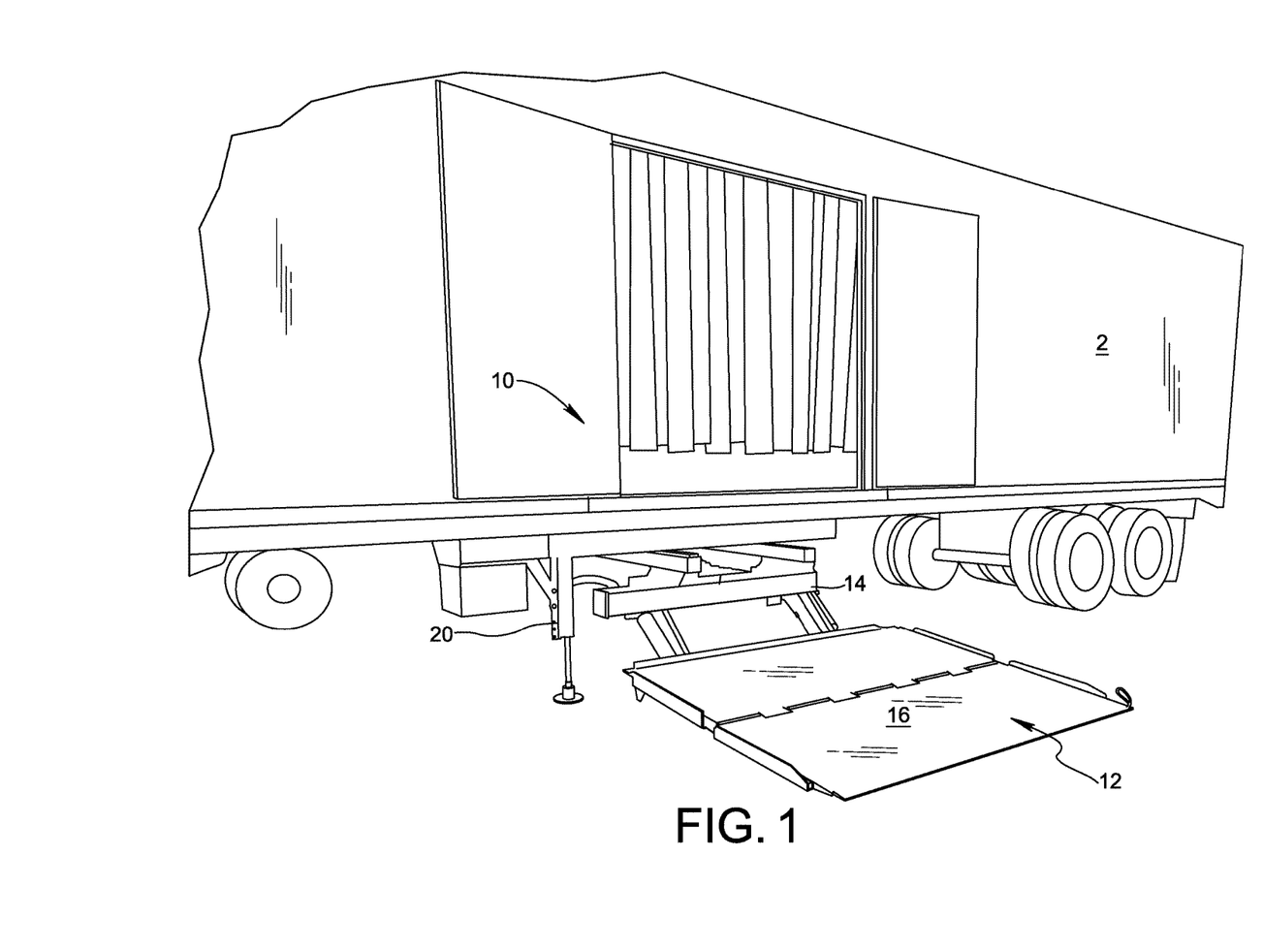
FIG. 1 is a perspective view of a side-loading liftgate system formed in accordance with an embodiment of the present invention.

FIG. 1 shows a sideloader liftgate system 10 formed in accordance with an embodiment of the present invention, wherein the liftgate system 10 is installed on a trailer 2. Liftgate system 10 generally comprises a liftgate 12 and a stabilizer leg 20. Liftgate 12 includes a linkage 14 adjustably supporting a cargo platform 16. Stabilizer leg 20 may be, for example, a hydraulic jack.

Figure 2:
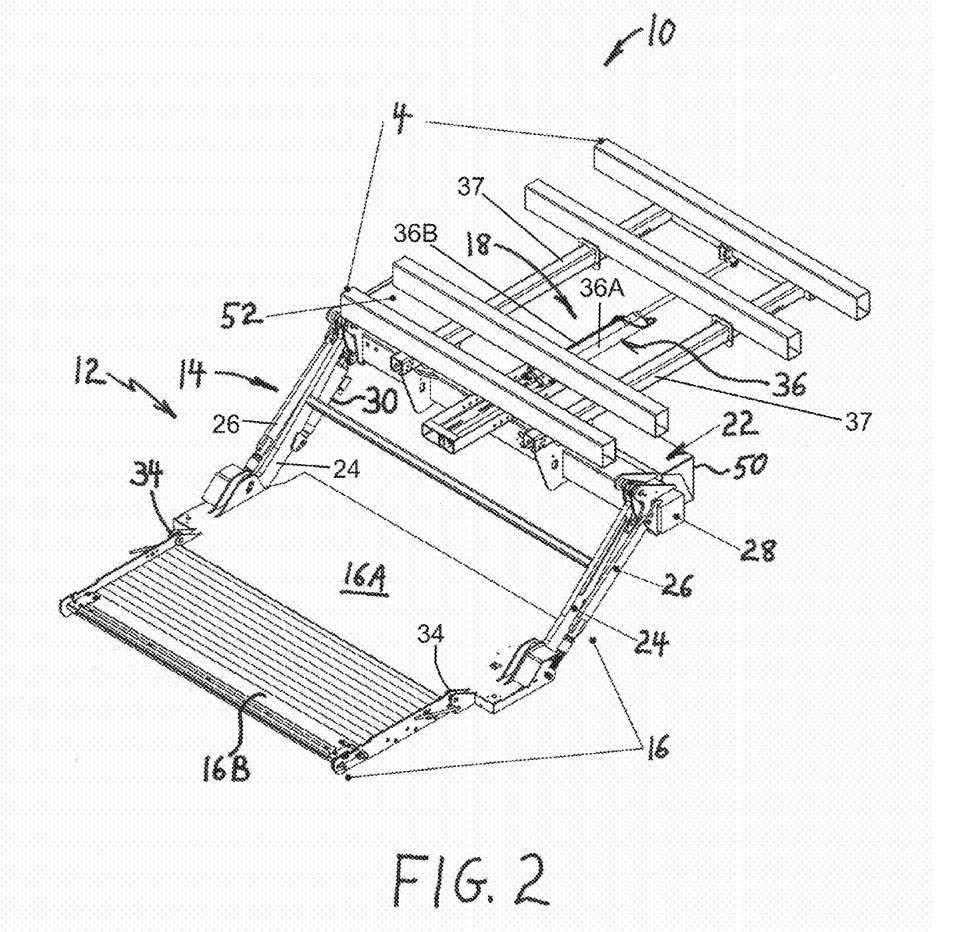
FIG. 2 is a perspective view showing a liftgate of the liftgate system in greater detail.

FIG. 2 shows liftgate 12 of liftgate system 10 in greater detail. Liftgate 12 is connected to subframe members 4 of trailer 2 by a deployment mechanism 18 that is adjustable to move liftgate 12 sidewise relative to trailer 2 between a storage position and a usage position. In the illustrated embodiment, deployment mechanism 18 includes a push-pull hydraulic cylinder pair 36 and laterally extending tracks 37 on which liftgate 12 is slidably mounted. For example, linkage 14 of liftgate 12 may include a mounting member 28 slidably coupled to tracks 37, and hydraulic cylinder pair 36 may have a first hydraulic linear actuator 36A and a second hydraulic linear actuator 36B arranged to operate in tandem with one another to push liftgate 12 laterally outward from under trailer 2 for deployment, and to pull liftgate 12 laterally inward under trailer 2 for storage.

In the embodiment of FIG. 2, linkage 14 includes a lift arm 24 and a parallel arm 26 adjustably linked to each end of mounting member 28 to provide a pair of parallelogram linkages for adjusting the position of platform 16 relative to mounting member 28. Height adjustment of platform 16 may be powered by a hydraulic lift actuator 30 associated with each lift arm 24. Tilt adjustment of platform 16 may also be provided, and may be powered by another pair of hydraulic actuators 32 not shown in FIG. 2, but represented schematically in FIGS. 4, 6 and 7. Platform 16 may be a folding platform having a primary portion 16A coupled to arms 24 and 26, and a folding portion 16B pivotally coupled to primary portion 16A by hinges 34.

FIG. 2 also shows constituents of an actuation system 22 operable to adjust both the deployment mechanism 18 and the stabilizer leg 20. In the exemplary embodiment, actuation system 22 is a hydraulic system having a hydraulic pump box 50 enclosing a motorized hydraulic pump, and a battery box 52 enclosing a power sources therefor. Details of hydraulic system 22 will be described below with reference to FIGS. 4, 6, and 7.

Figure 3A:
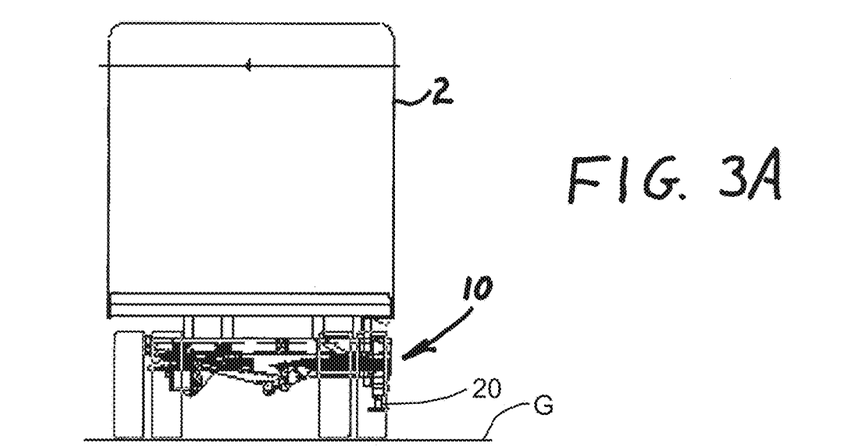
FIG. 3A is a rear elevational view of a truck trailer incorporating the side-loading liftgate system shown in FIG. 1, wherein a liftgate and a stabilizer leg of the liftgate system are shown in a storage position and a retracted state, respectively.
Figure 3B:
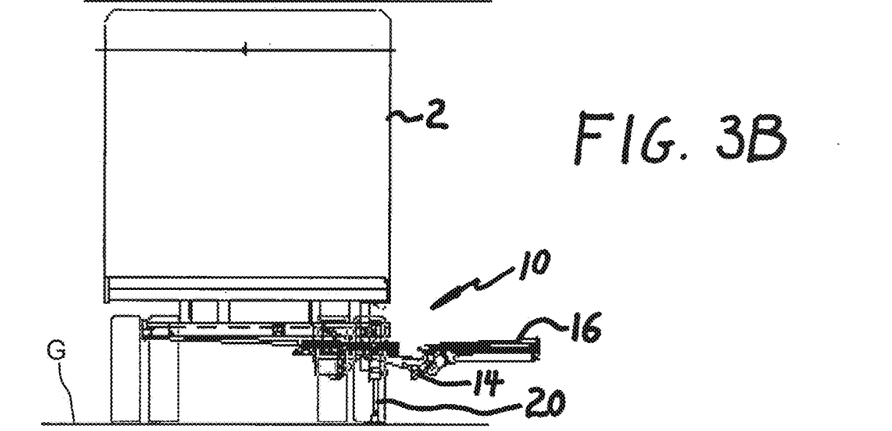
FIG. 3B is a view similar to that of FIG. 3A, wherein the liftgate and the stabilizer leg are shown in a usage position and an extended state, respectively.
Figure 3C:
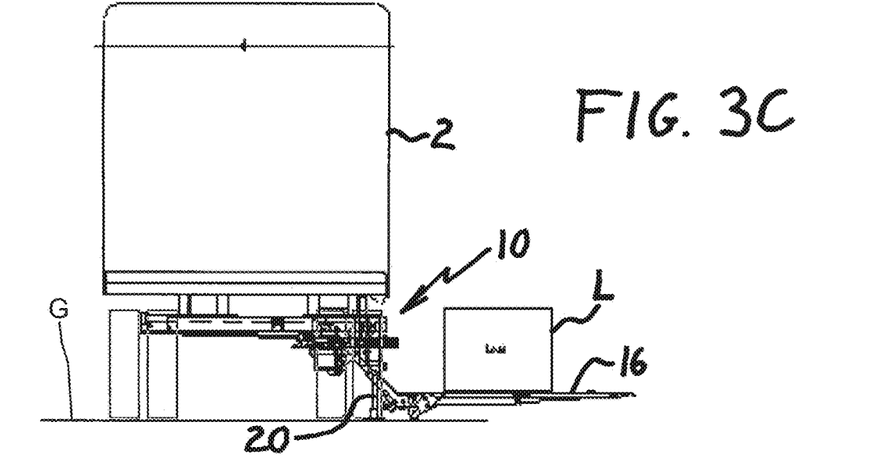
FIG. 3C is a view similar to that of FIG. 3B, wherein the liftgate is shown in a lowered usage position receiving a cargo load.

FIGS. 3A through 3C provide an operational overview of liftgate system 10. FIG. 3A shows liftgate system 10 when liftgate 12 is in a storage position under trailer 2. As may be seen, stabilizer leg 20 is in a retracted state off of ground G. FIG. 3B shows liftgate 12 deployed laterally outward to a usage position. When liftgate 12 is moved outward to the usage position by deployment mechanism 18, stabilizer leg 20 is automatically extended downward to meet ground G. Extension of stabilizer leg 20 may take place simultaneously with the deployment motion of liftgate 12, or may be performed sequentially before or after the deployment motion of liftgate 12. As will be explained below, deployment of liftgate 12 and extension of stabilizer leg 20 are caused by a single user input command; a separate command to extend stabilizer leg 20 is not necessary. As may be understood, a reverse process is followed for storing liftgate 12 after use. A single command entered by a user adjusts deployment mechanism 18 to bring liftgate 12 laterally inward underneath trailer 2, and retracts stabilizer leg 20 out of engagement with ground G.

Figure 4:
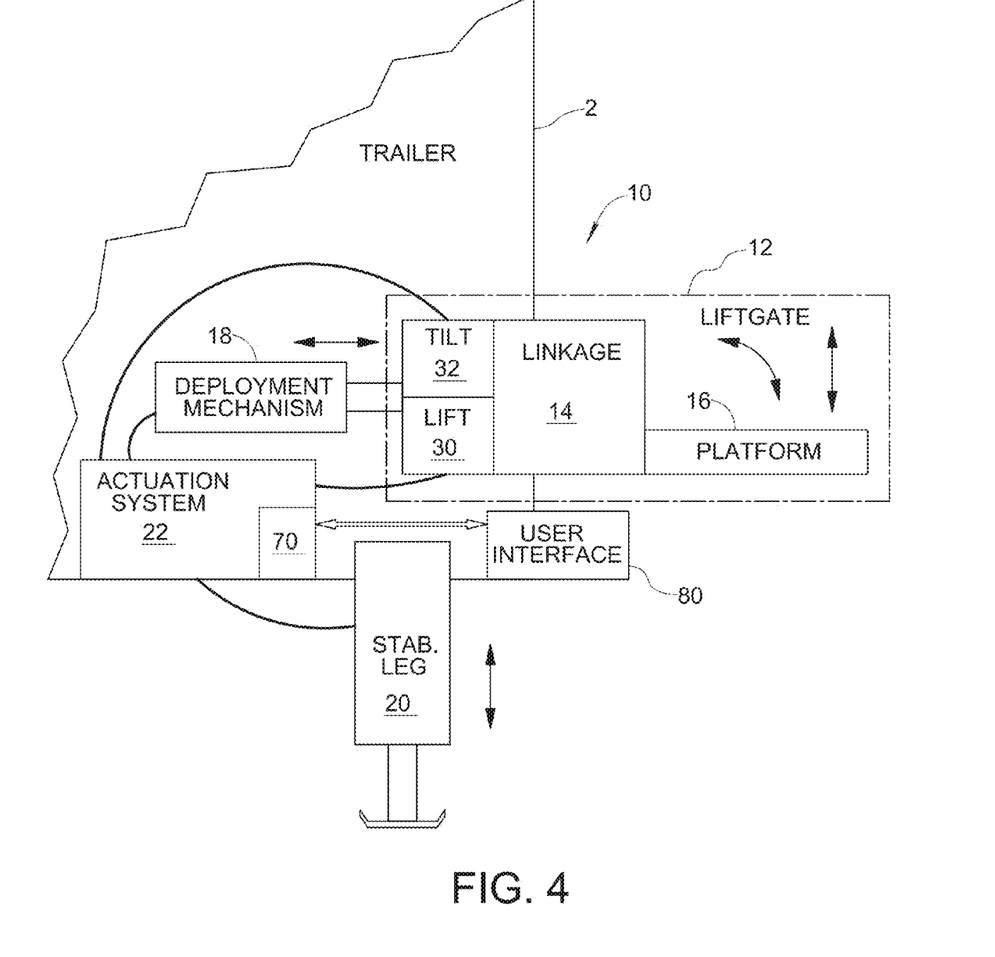
FIG. 4 is a schematic diagram of the liftgate system shown in FIG. 1.
Figure 5:
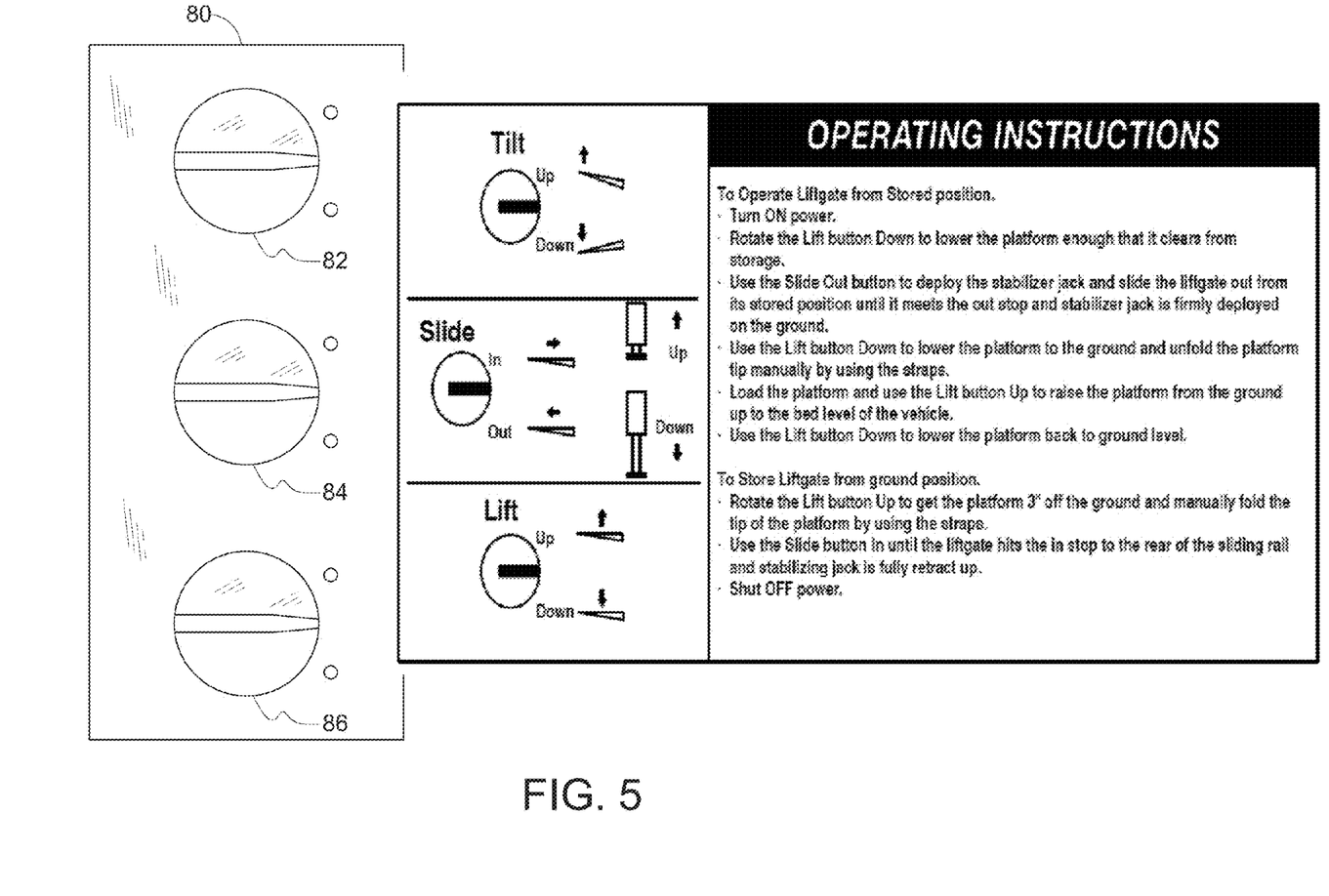
FIG. 5 is a plan view showing a user interface of the liftgate system.

FIG. 4 schematically represents liftgate system 10. As may be seen, a user interface 80 is provided allowing a user to input commands to a controller 70 which controls a pump and directional valves of hydraulic actuation system 22 to operate deployment mechanism 18, stabilizer leg 20, lift actuators 30, and tilt actuators 32. FIG. 5 shows one form of user interface 80, wherein the user interface includes three rotary knobs, each having a neutral position and two opposite operating positions. A top knob 82 is manually rotatable to tilt platform 16 up or down by way of hydraulic tilt actuators 32. A bottom knob 86 is manually rotatable to raise or lower the height of platform 16 by way of hydraulic lift actuators 30. In accordance with the present invention, a third knob 84 is manually rotatable in one direction to deploy liftgate 12 by way of deployment mechanism 18 and extend stabilizer leg 20 downward, and is manually rotatable in an opposite direction to store liftgate 12 by way of deployment mechanism 18 and retract stabilizer leg 20 upward. Thus, stabilizer leg 20 is automatically extended and retracted in coordination with deployment and storage of liftgate 12.

Figure 6:
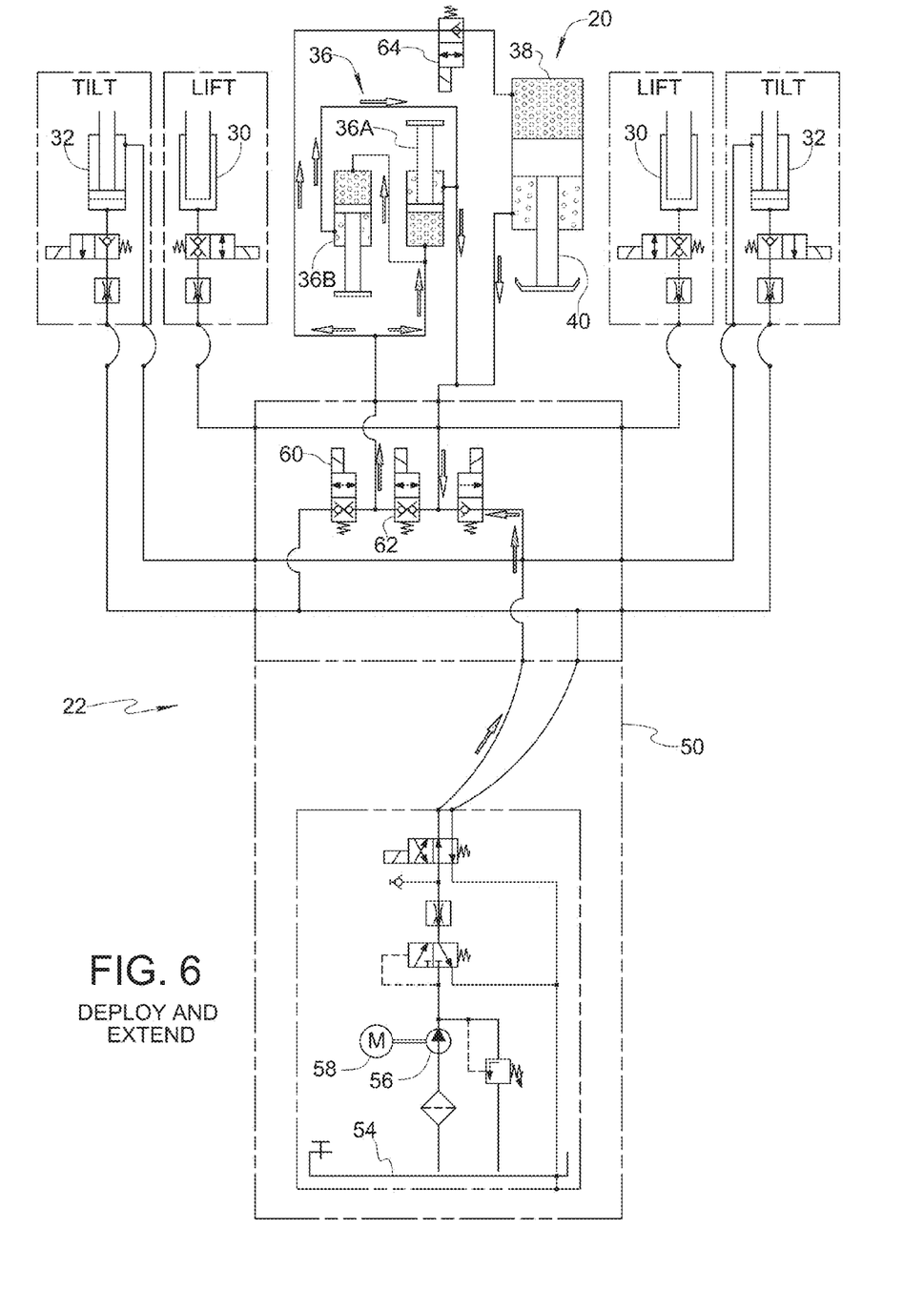
FIG. 6 is a schematic diagram of a hydraulic actuation system thereof, illustrating hydraulic flow to deploy the liftgate and extend the stabilizer leg.
Figure 7:
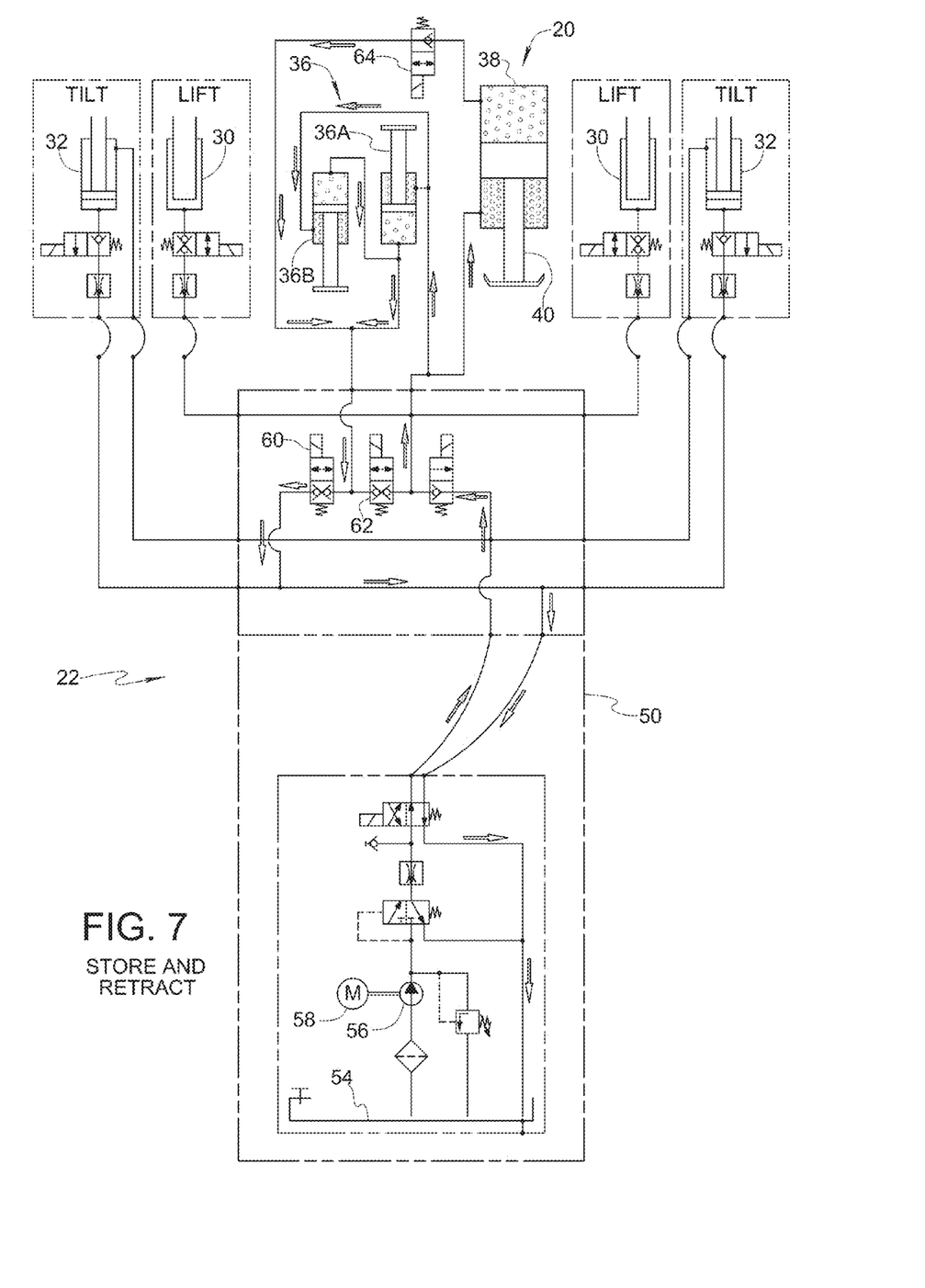
FIG. 7 is a schematic diagram similar to that of FIG. 6, however illustrating hydraulic flow to store the liftgate and retract the stabilizer leg.

FIGS. 6 and 7 are schematic diagrams of hydraulic actuation system 22. FIG. 6 illustrates hydraulic flow associated with deployment of liftgate 12 to a usage position and corresponding extension of stabilizer leg 20, whereas FIG. 7 illustrates hydraulic flow associated with movement of liftgate 12 to a storage position and corresponding retraction of stabilizer leg 20.

Looking first at FIG. 6, a motor 58 is signaled to drive a pump 56 to pump fluid from reservoir 54, and a directional valve 62 is opened to allow hydraulic fluid to travel to hydraulic actuator s 36A, 36B. As may be understood, actuators 36A and 36B are oppositely arranged and hydraulic fluid is delivered such that the fluid causes both actuators to extend in opposite directions. As a result, liftgate 12 is deployed laterally outward. Pressurized hydraulic fluid is also delivered through valve 64 to stabilizer leg 20, causing a piston 40 of stabilizer leg 20 to extend downward relative to a cylinder 38 of the stabilizer leg. Valve 64 may be a one-way check valve arranged such that when the valve is in its non-actuated state, the valve allows flow to extend stabilizer leg 20, and prevents opposite flow in order to maintain pressure in cylinder 38. Fluid on an opposite side of piston 40 is forced out of cylinder 38. Similarly, fluid is forced out of actuators 36A and 36B. This discharged fluid from cylinder 38 and actuators 36A and 36B is circulated through directional valve 62.

Turning now to FIG. 7, directional valve 62 is closed and directional valve 60 is opened. Valve 64 is also actuated to permit reverse flow. Consequently, pumped hydraulic fluid is directed to the counter side of the pistons of hydraulic actuators 36A, 36B and the counter side of piston 40 of stabilizer leg 20. As may be understood, this causes actuators 36A, 36B to retract and pull liftgate 12 back to its storage position, and further causes stabilizer leg 20 to retract. Retraction causes fluid to exit actuators 36A, 36B and stabilizer leg 20. Actuation of valve 64 allows flow out of the top portion of cylinder 38. The discharged fluid is routed back through directional valve 60 to reservoir 54.

As will be appreciated from the foregoing description, the present invention enhances safety by ensuring that stabilizer leg 20 is extended when liftgate 12 is deployed for use, and by also ensuring that the stabilizer leg is retracted when liftgate 12 is stored. Consequently, human error is eliminated.

While the invention has been described in connection with an exemplary embodiment, the detailed description is not intended to limit the scope of the invention to the particular forms set forth. The invention is intended to cover such alternatives, modifications and equivalents of the described embodiment as may be included within the scope of the invention.

What is claimed is:

1. A liftgate system for a trailer, the liftgate system comprising:
    a liftgate including a linkage and a platform mounted on the linkage;
    a hydraulically powered deployment mechanism connecting the liftgate to the trailer, wherein the deployment mechanism is adjustable to move the liftgate relative to the trailer between a storage position and a usage position;
    a hydraulically powered stabilizer leg adjustable between a retracted state and an extended state;
    a hydraulic actuation system operable to adjust the deployment mechanism and the stabilizer leg; and
    a control interface operable by a user to issue user-selectable commands to operate the hydraulic actuation system;
    wherein the user-selectable commands include a deployment command causing the actuation system to adjust the deployment mechanism to move the liftgate from the storage position to the usage position and to adjust the stabilizer leg from the retracted state to the extended state regardless of a load imposed on the liftgate;
    wherein the user-selectable commands include a storage command causing the actuation system to adjust the deployment mechanism to move the liftgate from the usage position to the storage position and to adjust the stabilizer leg from the extended state to the retracted state; and
    wherein the hydraulic actuation system includes a first line through which pressurized hydraulic fluid is delivered to both the deployment mechanism and the stabilizer leg in response to the deployment command and a second line through which pressurized hydraulic fluid is delivered to both the deployment mechanism and the stabilizer leg in response to the storage command.

2. The liftgate system according to claim 1, wherein the deployment mechanism includes at least one hydraulic cylinder.

3. The liftgate system according to claim 2, wherein the deployment mechanism includes a push-pull hydraulic cylinder pair.

4. The liftgate system according to claim 1, wherein the stabilizer leg includes a hydraulic jack.

5. A method of operating a liftgate system for a trailer, the method comprising the steps of:
    inputting a deployment command to a hydraulic actuation system; and
    operating the hydraulic actuation system in response to the deployment command to (i) deploy a liftgate of the liftgate system relative to the trailer from a storage position to a usage position and (ii) actuate a stabilizer leg of the liftgate system from a retracted state to an extended state, wherein the liftgate is deployed and the stabilizer leg is actuated to the extended state simultaneously regardless of a load imposed on the liftgate by delivering pressurized hydraulic fluid to both the deployment mechanism and the stabilizer leg by way of a first shared hydraulic line in response to the deployment command;
    inputting a storage command to the hydraulic actuation system; and
    operating the hydraulic actuation system in response to the storage command to (i) move the liftgate relative to the trailer from the usage position to the storage position and (ii) actuate the stabilizer leg from the extended state to the retracted state, wherein the liftgate is moved to the storage position and the stabilizer leg is actuated to the retracted state simultaneously by delivering pressurized hydraulic fluid to both the deployment mechanism and the stabilizer leg by way of a second shared hydraulic line in response to the storage command.

* * * * *